Sept. 10, 1968 OSAMU SAMUTA 3,400,599

TURNTABLE DRIVING APPARATUS

Filed July 11, 1966

United States Patent Office 3,400,599
Patented Sept. 10, 1968

3,400,599

TURNTABLE DRIVING APPARATUS

Osamu Samuta, Yokohama, Japan, assignor to Victor Company of Japan, Limited, Yokohama, Japan, a corporation of Japan Filed July 11, 1966, Ser. No. 564,249
Claims priority, application Japan, July 28, 1965, 40/45,708; (utility models), 40/61,985, 40/61,986, and 40/61,987
4 Claims (Cl. 74—194)

ABSTRACT OF THE DISCLOSURE

A turntable driving apparatus having a first idler formed by a relatively hard elastic material abutting a second idler formed by a relatively soft elastic material. A multistage pulley driven by a turntable drive motor selectively engages the first idler to drive it at the selected rotational speed. The second idler engages with a vertical peripheral edge of the turntable to transmit the rotational drive thereto. The transmission of vibration from the turntable drive motor to the turntable is substantially prevented by the second idler.

This invention relates to an apparatus for transmitting rotation from a driving source to a turntable for record player etc.

The conventional turntable driving apparatus has had a mechanism for transmitting the rotation of a motor to the turntable through an idler provided between the turntable and a multistage pulley attached to the shaft of said motor for changing the revoluton speed of said turntable.

In this conventional apparatus, however, the thickness of the idler is determined by each stage of said multistage pulley, so that the thickness of the idler may not be thickened enough.

As the thickness of such idler is restricted up to 3–4 m./m., for example, an idler made of resilient soft materials such as soft rubber can not be used and comparative hard materials such as hard rubber must be used. When the idler made of hard materials is used the undesired vibration generated on revolution of the motor is transmitted to the turntable through the idler, and it is a defect.

An object of this invention is to obviate the defect of said conventional apparatus.

An object of this invention is to provide a turntable driving apparatus for driving a turntable without transmitting undesired vibration generated by the revolution of a driving motor to the turntable.

Another object of this invention is to provide a turntable driving apparatus using a turntable which can be easily manufactured.

Figure 1:
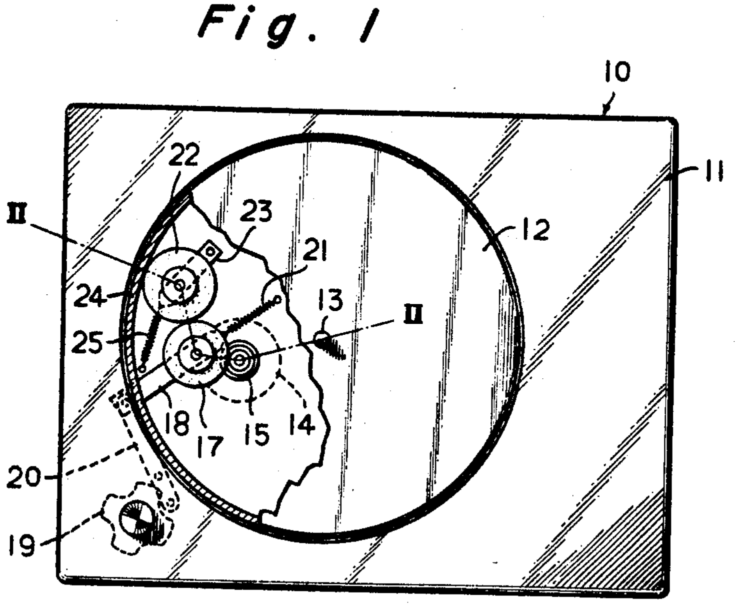
Figure 2:
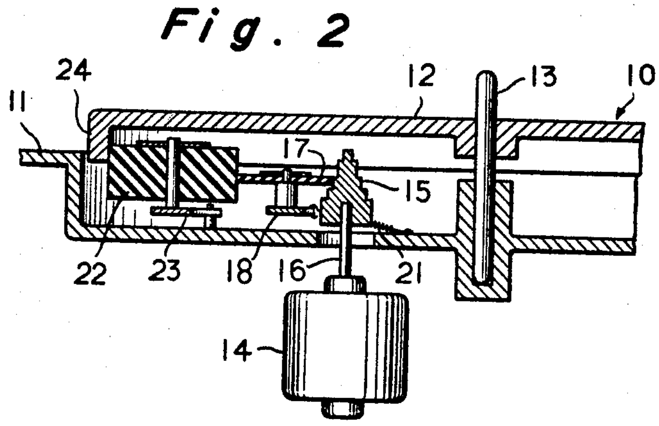

Other objects and characteristics of this invention will become apparent from a detailed description and the accompanying drawing in which;

FIG. 1 is a plan view, partially in section, of an embodiment of the present invention; and FIG. 2 is a side view of the preceding FIG. 1 cross-sectioned along lines II—II.

In FIGS. 1 and 2, a motorboard 11 of a record playing apparatus 10, is shown. Turntable 12 is to be rotated and includes a spindle 13 for a phonograph record (not shown) and is mounted so as to rotate freely on said motorboard 11. Phonomotor 14 is mounted to the motorboard 11 via a suitable vibration absorber (not shown.) A multi-stage pulley 15 is fixed to the rotary shaft 16 of said motor 14 and has stages of different diameters for revolutions of 16, 33⅓, 45 and 78, respectively.

First idler 17 is made of elastic materials, such as comparatively thin and hard rubber and, in this embodiment, it is constructed as 3.5 m./m. in thickness, 50 m./m. in diameter and 55° durometer in hardness. Said idler 17 is provided so as to rotate freely on an arm lever 18, and its level or height is varied by the well known manner, for example, by a rotary cam 19 via an arm lever 20 of which both ends are connected to said arm lever 18 and said cam 19, thereby said idler is engaged with one of the stages of said multistage pulley. Spring 21 is provided between an end part of the arm lever 18 and the motorboard 11 and normally urges the idler 17 into engagement with the multistage pulley. Second idler 22 is made of elastic materials, such as thicker and softer rubber than said first idler and, in this embodiment, is constructed 20 m./m. in thickness, 50 m./m. in diameter and 40° durometer in hardness. Said idler 22 is provided so as to rotate freely on an arm lever 23 and when the first idler 17 abuts the multi-stage pulley 15, the second idler 22 is urged toward and abuts on the inside of a vertical portion 24 of the peripheral edge of the turntable 12 by said first idler 17. Accordingly, the rotation of the motor 14 is transmitted via the idlers 17 and 22 to the turntable 12 and the turntable is rotated. Spring 25 is provided between one end of the arm lever 23 and the motorboard 11 and when the first idler 17 is released from the multistage pulley 15 and the second idler 22 against the force of the spring 21, namely, when the apparatus is set in the OFF position, said spring 25 acts to separate the second idler 22 from the inside of the vertical portion 24.

In said construction, the thickness of the second idler 22 must be at least larger than the range of the level change of the first idler 14 abutting one of the stages of the multi-stage pulley 15.

By the construction described above, the vibration generated by the rotation of the motor 3 is decreased on passing through the first and second idlers, especially in the soft second idler, and substantially no vibration is transmitted to the turntable. In other words, said vibration is decreased by the compliances of the first and second idlers and by the mass of the turntable.

The turntable 12 is driven directly by the second idler 22 the level of which is not changed, so that the length of the vertical portion on the peripheral edge of said turntable may be shortened. That is, the length of the vertical portion of the known apparatus was 21 m./m., however, in the embodiment of this invention it is constructured 8–10 m./m.

The present invention is not limited to the embodiment described above, of course it will be understood that modifications and variations may be effected without departing from the spirit and scope of the novel concepts of this invention.

What I claim is:

1. A turntable driving apparatus comprising a drive motor, a pulley operatively connected to be driven by said motor, a freely rotatable turntable having a vertically depending portion along the peripheral edge thereof, a first idler made of elastic material having a predetermined hardness, said first idler being rotated through engagement with said pulley, first spring means biasing said first idler into constant contact with said pulley, a second idler made of elastic material having a thickness greater than that of said first idler, said second idler abutting both said first idler and said vertically depending portion of said turntable to transmit rotational forces therebetween, and second spring means biasing said second idler away from said first idler, said first idler being of a material harder than said second idler.

2. A turntable driving apparatus according to claim 1 wherein said first idler is 55° durometer in hardness and said second idler is 40° durometer in hardness.

3. A turntable driving apparatus comprising a drive motor, a multistage pulley having portions of successively different diameters and being operatively connected to be driven by said motor, a freely rotatable turntable having a vertically depending portion along the peripheral edge thereof, a first idler made of elastic material having a predetermined hardness and being selectively positioned vertically so as to abut each succesive portion of said multistage pulley and be rotated by the rotation of said drive motor, a first spring means biasing said first idler into constant contact with said multistage pulley, a second idler made of elastic material softer than the elastic material of said first idler, said second idler having a thickness larger than said first idler and abutting both said first idler and said vertically depending portion of said turntable to transmit rotational forces therebetween, and second spring means biasing said second idler out of engagement with said first idler means.

4. A turntable driving apparatus according to claim 3 wherein said first and second idlers are 55° and 40° durometer in hardness respectively.

References Cited

UNITED STATES PATENTS

| | | | |
|---|---|---|---|
| 2,704,461 | 3/1955 | Jahncke | 74—200 |
| 2,818,741 | 1/1958 | Siebert | 74—200 |
| 2,866,346 | 12/1958 | Hartman | 74—190 |
| 2,884,795 | 5/1959 | Coven | 74—194 |

C. J. HUSAR, *Primary Examiner.*